United States Patent
Sakurai et al.

(10) Patent No.: US 11,447,083 B2
(45) Date of Patent: Sep. 20, 2022

(54) VEHICLE AND ELECTROSTATIC ELIMINATION COMPONENT

(71) Applicant: TOYOTA JIDOSHA KABUSHIKI KAISHA, Toyota (JP)

(72) Inventors: Kenichiro Sakurai, Toyota (JP); Yoshiaki Kajikawa, Aichi-gun (JP); Junichi Sudo, Miyoshi (JP); Koushi Yamada, Odawara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/394,538

(22) Filed: Aug. 5, 2021

(65) Prior Publication Data
US 2022/0073022 A1      Mar. 10, 2022

(30) Foreign Application Priority Data
Sep. 10, 2020   (JP)   ............ JP2020-151881

(51) Int. Cl.
    *B60R 16/06*     (2006.01)
(52) U.S. Cl.
    CPC ................ *B60R 16/06* (2013.01)
(58) Field of Classification Search
    CPC ................. B60R 16/06; H05F 3/00
    USPC ....................................... 361/217
    See application file for complete search history.

(56) References Cited

U.S. PATENT DOCUMENTS

| 5,761,022 A * | 6/1998 | Rankilor | .............. H05F 3/00 361/220 |
| 2016/0280162 A1 | 9/2016 | Yamada et al. | |
| 2016/0288844 A1 * | 10/2016 | Tanahashi | ............ B62D 37/02 |
| 2018/0265715 A1 | 9/2018 | Suzuki et al. | |
| 2020/0039457 A1 | 2/2020 | Dawe et al. | |

FOREIGN PATENT DOCUMENTS

| JP | S56-006652 U | 1/1981 | |
| JP | H07-042093 U | 7/1995 | |
| JP | 4228377 B2 * | 2/2009 | ............ F16L 11/12 |
| JP | 6168157 B2 | 7/2017 | |

(Continued)

OTHER PUBLICATIONS

Etfe: "Electrical Properties of Plastic Materials", Jan. 1, 2022, pp. 1-4, XP055878940.

*Primary Examiner* — Kevin J Comber
(74) *Attorney, Agent, or Firm* — Oliff PLC

(57) ABSTRACT

An aspect of the present disclosure provides a vehicle which includes: an electrostatic eliminator that reduces a positive charge of a specific portion or that charges the specific portion with a negative charge, the specific portion being defined as a portion to be positively charged at which a positively charged air flow that flows around a vehicle body during travel starts to vary from a flow along a surface of the positively charged vehicle body to a flow separated from the surface as negative charges are accumulated because of the external factors. The specific portion is constituted from a conductive material with a surface resistance value that is less than a surface resistance value of the electrostatic eliminator. The electrostatic eliminator is constituted from a conductive resin with a surface resistance value in a range of $10^2 \Omega$ or more and less than $10^{11} \Omega$.

6 Claims, 4 Drawing Sheets

(56) References Cited

FOREIGN PATENT DOCUMENTS

| | | |
|---|---|---|
| JP | 6344292 B2 | 6/2018 |
| JP | 2019-192568 A | 10/2019 |
| JP | 6630696 B2 | 1/2020 |

* cited by examiner

VEHICLE AND ELECTROSTATIC ELIMINATION COMPONENT

CROSS-REFERENCE TO RELATED APPLICATION

This application claims priority to Japanese Patent Application No. 2020-151881 filed on Sep. 10, 2020, incorporated herein by reference in its entirety.

BACKGROUND

1. Technical Field

The present disclosure relates to a vehicle and an electrostatic elimination component.

2. Description of Related Art

When a vehicle such as an automobile travels, static electricity is generated in the vehicle because of an air flow that flows in frictional contact with the vehicle. Static electricity is also generated when various portions of tires repeatedly contact and separate from a road surface along with rotation of wheels, constituent components of an engine, a brake device, etc. move relative to each other, etc.

Since the vehicle is substantially electrically insulated from the ground by the tires with low conductivity, the vehicle body etc. is charged with a charge (in general, a positive charge) when static electricity is generated in the vehicle. Therefore, structures that reduce the charge with which the vehicle is charged through energization have hitherto been studied, and a variety of such structures have been proposed.

For example, Japanese Patent No. 6168157 describes a vehicle having a vehicle body that is retained in the state of being insulated from a road surface and that is positively charged by static electricity due to external factors including traveling, the vehicle including a self-discharging electrostatic eliminator that reduces a positive potential of a specific portion determined in advance, which is at least one of locations in a separating shape at which a positively charged air flow that flows around the vehicle body during travel starts to vary from a flow along the surface of the charged vehicle body to a flow separated from the surface and at which separation of the air flow is suppressed to improve the operational stability of the vehicle, by neutralizing the positive potential through self-discharge in which negative air ions are generated in accordance with the positive potential. Japanese Patent No. 6168157 describes the material of the self-discharging electrostatic eliminator as conductive metal such as aluminum, gold, silver, and copper. Japanese Patent No. 6168157 also describes the shape of the self-discharging electrostatic eliminator as a shape having such a sharp or pointed corner portion that causes corona discharge.

Japanese Patent No. 6344292 describes a vehicle having a vehicle body that is retained in the state of being insulated from a road surface and that is positively charged by static electricity due to external factors including traveling, the vehicle including a minus ionization material that reduces a positive potential of a specific portion or that charges the specific portion with a negative potential, the specific portion being defined as a portion to be positively charged at which a positively charged air flow that flows around the vehicle body during travel starts to vary from a flow along the surface of the positively charged vehicle body to a flow separated from the surface as negative charges are accumulated because of the external factors, and the minus ionization material being integrated with the specific portion. Japanese Patent No. 6344292 describes the minus ionization material as a paint containing powder tourmaline and an acrylic or polyester resin material.

Japanese Unexamined Patent Application Publication No. 2019-192568 (JP 2019-192568 A) describes an electrostatic eliminator for a vehicle in the state of being insulated from a road surface, the electrostatic eliminator being provided at at least one specific portion of the vehicle to be charged with positive static electricity because of at least one of a factor due to travel of the vehicle and a factor other than the factor due to travel of the vehicle, and the electrostatic eliminator being configured to reduce a positive potential of the specific portion by generating negative air ions through self-discharge and neutralizing the positive potential with the negative air ions, in which: the electrostatic eliminator includes a resin tape to be applied to the specific portion via an adhesive; the surface resistance value of the adhesive is $1\times10^{10}$ ($\Omega$) to $1\times10^{11}$ ($\Omega$); the resin tape is formed from a synthetic resin material that is easily charged with negative static electricity as opposed to the specific portion in comparison with the specific portion; the surface area of the resin tape is equal to the surface area of an aluminum adhesive tape having the same discharge characteristics for reducing the positive potential of the specific portion and neutralizing the positive potential with the negative air ions; the peripheral edge portion of the resin tape and the peripheral edge portion of the aluminum adhesive tape are formed to be sharp or pointed so as to cause the self-discharge; and the length of the peripheral edge portion of the resin tape is three times to five times the length of the peripheral edge portion of the aluminum adhesive tape. JP 2019-192568 A describes the material of the resin tape as vinyl chloride or polytetrafluoroethylene (PTFE).

Japanese Patent No. 6630696 describes an antistatic composition for a vehicle, the antistatic composition containing nickel powder and an acid-modified polyolefin resin, and containing 2.5 to 15 vol. % of the nickel powder in terms of pigment volume (vol. %).

SUMMARY

There is known a vehicle in which an electrostatic eliminator such as a conductive tape is applied for the purpose of eliminating static electricity from a vehicle body of the vehicle. However, there are several issues with the technologies according to the above documents. For example, in the vehicle including a self-discharging electrostatic eliminator described in Japanese Patent No. 6168157, the electrostatic elimination effect of the self-discharging electrostatic eliminator tends to be subjected to disturbance such as water vapor in the air. In addition, the self-discharging electrostatic eliminator, which is formed from the conductive metal mentioned in Japanese Patent No. 6168157, is substantially not optically transparent, and therefore may degrade the design. Further, the electrostatic elimination effect of the self-discharging electrostatic eliminator described in Japanese Patent No. 6168157 is exhibited through corona discharge, and therefore an advantageous effect may not be exhibited under a condition at a low electrostatic pressure.

When a vinyl chloride tape, for example, is used in the electrostatic eliminator described in JP 2019-192568 A, the vinyl chloride tape can be charged with a small amount of negative charges compared to the conductive metal described in Japanese Patent No. 6168157. Therefore, a sufficient effect may not be exhibited even if the area of the tape disposed is equal to that of the conductive metal. In addition, the electrostatic eliminator, which is formed from vinyl chloride, is substantially not optically transparent, and therefore may degrade the design. Further, the electrostatic eliminator, which is formed from vinyl chloride, has a low allowable temperature limit, and therefore may be less durable.

Aspects of the present disclosure provides a vehicle having an electrostatic eliminator capable of exhibiting an electrostatic elimination effect even at a non-conductive portion with a low electrostatic pressure.

The inventors have found that, in a vehicle having a vehicle body that is retained in the state of being insulated from a road surface and that is positively charged by static electricity due to external factors including traveling, the operational stability of the vehicle can be improved by reducing a positive charge generated at a specific portion constituted from a conductive material, or charging the specific portion with a negative charge, by disposing an electrostatic eliminator constituted from a conductive resin at the specific portion. The inventors completed the present disclosure based on the above findings.

(1) A first aspect of the present disclosure relates to a vehicle having a vehicle body configured to be retained in a state of being insulated from a road surface and to be positively charged by static electricity due to external factors including traveling.

The vehicle includes an electrostatic eliminator that reduces a positive charge of a specific portion or that charges the specific portion with a negative charge, the specific portion being defined as a portion to be positively charged at which a positively charged air flow that flows around the vehicle body during travel starts to vary from a flow along a surface of the positively charged vehicle body to a flow separated from the surface.

The specific portion is constituted from a conductive material with a surface resistance value that is less than a surface resistance value of the electrostatic eliminator. The electricity eliminator is constituted from a conductive resin with a surface resistance value in a range of $10^2 \Omega$ or more and less than $10^{11} \Omega$.

(2) The electrostatic eliminator may be in a shape of a tape and with an adhesive provided on at least a part of a surface of the electrostatic eliminator, the surface facing a surface of the specific portion.

(3) The electrostatic eliminator may be in a shape of a coating film integrated with the specific portion.

(4) The conductive resin may be at least one resin selected from the group consisting of fluorine resin, polyester, polyethylene terephthalate, polyvinyl chloride, polypropylene, and a combination of fluorine resin, polyester, polyethylene terephthalate, polyvinyl chloride, and polypropylene.

(5) The conductive resin may be a conductive fluorine resin.

(6) The specific portion may be a wheel nut, a wheel nut cover, a radiator, an engine, a transmission, a differential, or an exhaust pipe.

(7) A second aspect of the present disclosure relates to an electrostatic elimination component including: an electrostatic eliminator constituted from a conductive resin with a surface resistance value in a range of $10^2 \Omega$ or more and less than $10^{11} \Omega$; and a specific portion constituted from a conductive material with a surface resistance value that is less than the surface resistance value of the electrostatic eliminator.

(8) The electrostatic eliminator may be in a shape of a tape and with an adhesive provided on at least a part of a surface of the electrostatic eliminator, the surface facing a surface of the specific portion.

(9) The electrostatic eliminator may be in a shape of a coating film integrated with the specific portion.

(10) The specific portion may be a wheel nut, a wheel nut cover, a radiator, an engine, a transmission, a differential, or an exhaust pipe.

With the aspects of the present disclosure, it is possible to provide a vehicle having an electrostatic eliminator capable of exhibiting an electrostatic elimination effect even at a non-conductive portion with a low electrostatic pressure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Vehicle

Figure 1:
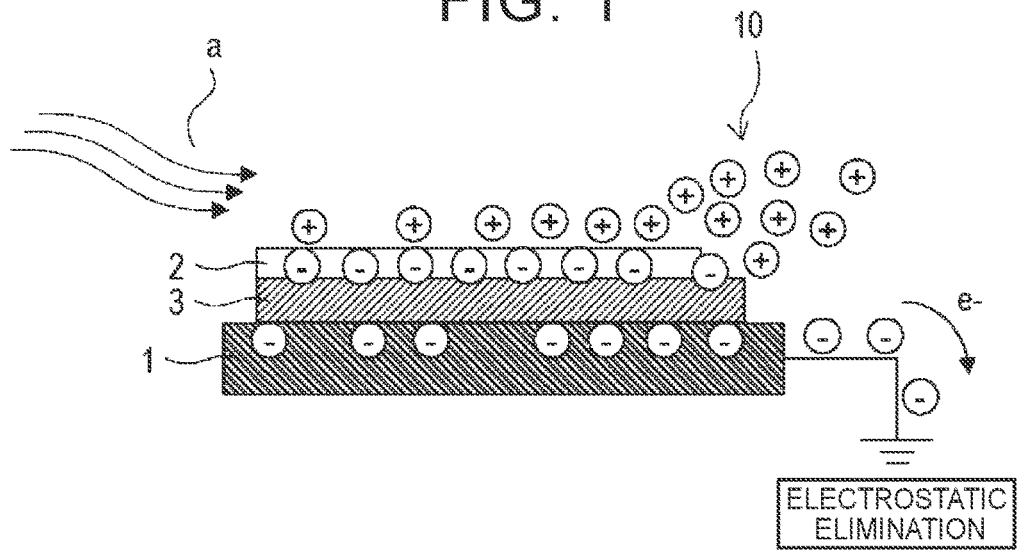
FIG. 1 is a schematic diagram illustrating an electrostatic elimination effect of an embodiment of a vehicle according to an aspect of the present disclosure.

The inventors have found that, in a vehicle having a vehicle body that is retained in the state of being insulated from a road surface and that is positively charged by static electricity due to external factors including traveling, the operational stability of the vehicle can be improved by reducing a positive charge generated at a specific portion constituted from a conductive material, or charging the specific portion with a negative charge, by disposing an electrostatic eliminator constituted from a conductive resin at the specific portion. Therefore, an aspect of the present disclosure relates to a vehicle including a vehicle body and an electrostatic eliminator.

A vehicle according to the present aspect includes a vehicle body. The vehicle body is retained in the state of being insulated from a road surface by tires constituted from an insulator material such as rubber or a material with a low electrical conductivity. The vehicle body is normally positively charged by static electricity due to a variety of external factors. Examples of the external factors include traveling of the vehicle. When the vehicle travels, the vehicle body is positively charged through electric action that accompanies friction between a travel air flow, an air flow that flows in intake and exhaust pipes, etc. and the vehicle body. Alternatively, when the vehicle travels, a power unit such as an engine or a motor and devices such as a transmission and/or suspensions are driven. At this time, the vehicle body is positively charged through electric action that accompanies sliding of members that constitute the devices. Alternatively, the vehicle body is positively charged through electric action that accompanies friction between the tires and the road surface. Alternatively, the vehicle body is positively charged by electricity generated by a variety of electric instruments mounted on the vehicle or external electric instruments such as power transmission lines installed around the vehicle.

The vehicle body to be charged by static electricity as described above includes not only members constituted from a material with a low electrical conductivity, but also members constituted from a material with a high electrical conductivity such as a metal material, such as bodies and panels. Even a vehicle body including a member constituted from a material with a high electrical conductivity has a certain electrical resistance at a coupling portion with another member, and thus may be positively charged.

Normally, the air is charged with a positive charge. Therefore, in the vehicle according to the present aspect, when the vehicle body is positively charged by external factors such as traveling, a repulsive force is generated between a positively charged air flow that flows around the vehicle body during travel and the vehicle body. The air flow may be separated from the surface of the vehicle body by the repulsive force. At this time, the air flow may be varied from a flow along the surface of the charged vehicle body to a flow separated from the surface of the vehicle body. In the vehicle according to the present aspect, the portion at which such a variation occurs is defined as a "specific portion". In the vehicle according to the present aspect, such a variation may occur at a location at which the outer surface of the vehicle body is bent toward the inner side of the vehicle body, or a location at which the outer surface of the vehicle body is bent toward the outer side of the vehicle body, when the vehicle body is seen from the front, for example. In the vehicle according to the present aspect, such locations are included in the specific portion. Examples of the specific portion include a location at which a surface is bent such that the vehicle width becomes narrower on both the right and left sides of the vehicle body, a location at which a surface is bent such that the height becomes lower on the hood or the roof, a location at which the lower surface of the vehicle body that extends downward toward the rear side of the vehicle is bent so as to extend horizontally on a portion (e.g. an undercover) exposed to the lower surface of the vehicle body, a location at which the lower surface of the vehicle body that extends horizontally toward the rear side of the vehicle is bent so as to be gradually raised, and a location at which a surface is locally projected or stepped toward the outer side of the vehicle body.

Figure 2:
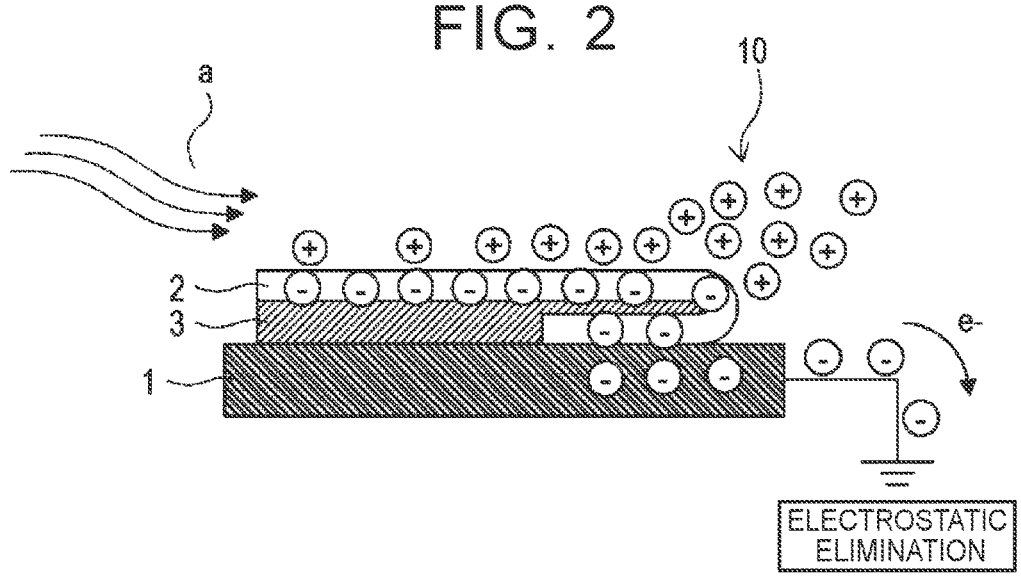
FIG. 2 is a schematic diagram illustrating an electrostatic elimination effect of another embodiment of the vehicle according to the aspect of the present disclosure.
Figure 3:
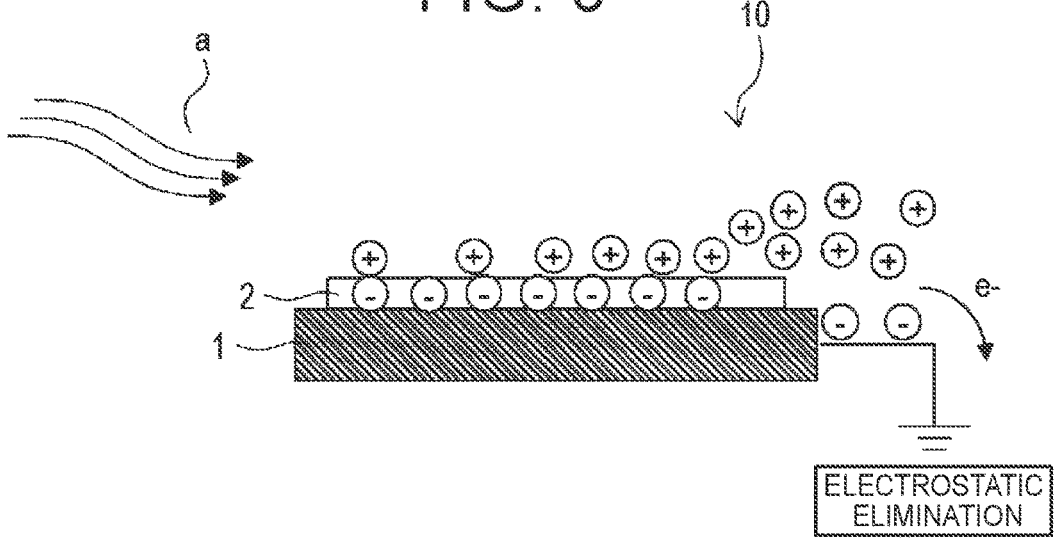
FIG. 3 is a schematic diagram illustrating the electrostatic elimination effect of another embodiment of the vehicle according to the aspect of the present disclosure.

In each aspect of the present disclosure, the term "electrostatic eliminator" means a member capable of eliminating (i.e. removing) a charge from the vehicle body. In the vehicle according to the present aspect, the electrostatic eliminator may exhibit the electrostatic elimination effect when the electrostatic eliminator is disposed at the specific portion. FIGS. 1 to 3 are each a schematic diagram illustrating the electrostatic elimination effect in a variety of embodiments of the vehicle according to the present aspect. As illustrated in FIGS. 1 to 3, when the vehicle according to the present aspect is exposed to external factors including traveling, a vehicle body 10 is positively charged by static electricity due to the external factors. A positively charged air flow a that flows around the vehicle body 10 during travel starts to vary from a flow along the surface of the positively charged vehicle body 10 to a flow separated from the surface at a specific portion 1 because of a repulsive force between the surface of the positively charged vehicle body 10 and the air flow a. An electrostatic eliminator 2 is disposed on the surface of the specific portion 1. As described below, the shape of the electrostatic eliminator 2 can be selected, as appropriate, based on the specific portion 1. The electrostatic eliminator 2 is charged with a negative charge by external factors. The negative charge of the electrostatic eliminator 2 can reduce a positive charge on the surface and/or in the vicinity of the specific portion 1 at which the electrostatic eliminator 2 is disposed, and/or charge, with a negative charge, the surface and/or the vicinity of the specific portion 1 at which the electrostatic eliminator 2 is disposed. Since the specific portion 1 is constituted from a conductive material, the negative charge may also move to the inside of the vehicle body 10. The net charge of the specific portion 1 is determined in accordance with the potential difference between the positive charge generated at the specific portion 1 by static electricity due to external factors and the negative charge generated at the electrostatic eliminator 2 by static electricity due to external factors. For example, when the positive charge generated at the specific portion 1 exceeds the negative charge generated at the electrostatic eliminator 2, the net positive charge at the specific portion 1 can be reduced. In this case, the repulsive force between the surface of the vehicle body and the air flow may be reduced. Alternatively, when the negative charge generated at the electrostatic eliminator 2 exceeds the positive charge generated at the specific portion 1, the specific portion 1 can be charged with a negative charge. In this case, an electrostatic attraction (Coulomb force) may be generated between the front surface of the vehicle body and the air flow. Consequently, separation of an air flow from the surface of the vehicle body may be substantially suppressed by reducing the repulsive force between the surface of the vehicle body and the air flow and/or generating an electrostatic attraction (Coulomb force) between the front surface of the vehicle body and the air flow. By suppressing separation of an air flow, a variation or a reduction in the aerodynamic characteristics of the vehicle (e.g. the aerodynamic characteristics in the rolling direction, the yaw direction, and/or the pitching direction of the vehicle) may be substantially suppressed to exhibit desired aerodynamic characteristics determined in design. Therefore, by disposing the electrostatic eliminator at the specific portion in the vehicle according to the present aspect, separation of an air flow from the surface of the vehicle body can be substantially suppressed to improve the operational stability of the vehicle.

In the vehicle according to the present aspect, the specific portion is constituted from a conductive material. The surface resistance value of the specific portion is normally less than the surface resistance value of the electrostatic eliminator, and is in the range of less than $10^2 \Omega$, for example, particularly in the range of less than $10^{-5} \Omega$. Examples of the conductive material having a surface resistance value in the above range include metal such as iron, aluminum, and copper and alloys of such metal. In the vehicle according to the present aspect, by disposing the electrostatic eliminator at the specific portion that is constituted from a conductive material having a surface resistance value in the above range, separation of an air flow from the surface of the vehicle body can be substantially suppressed via the electrostatic elimination effect of the electrostatic eliminator to improve the operational stability of the vehicle.

In the vehicle according to the present aspect, the electrostatic eliminator is constituted from a conductive resin that may be charged with a negative charge because of the external factors described above. The surface resistance value of the electrostatic eliminator is preferably in the range of $10^2 \Omega$ or more and less than $10^{11} \Omega$, more preferably in the range of $10^4 \Omega$ or more and less than $10^{11} \Omega$, and still more preferably in the range of $10^4 \Omega$ or more and less than $10^8 \Omega$. Examples of the conductive resin having a surface resistance value in the above range include a carbon-containing fluorine resin, carbon-containing polyester, carbon-containing polyethylene terephthalate, carbon-containing polyvinyl chloride, carbon-containing polypropylene, carbon-containing natural rubber (NR rubber), carbon-containing isoprene rubber (IR rubber), carbon-containing butadiene rubber (BR rubber), carbon-containing acrylonitrile-butadiene rubber (NBR rubber), carbon-containing ethylene-propylene-diene rubber (EPDM rubber), carbon-containing hydrogenated nitrile rubber (HNBR rubber), carbon-containing fluorine rubber (FKM rubber), carbon-containing polyethylene, a carbon-containing methacrylic resin, a carbon-containing polyamide resin, a carbon-containing polycarbonate resin, a carbon-containing acrylonitrile-butadiene-styrene copolymer resin (ABS resin), carbon-containing acrylonitrile, carbon-containing styrene, a carbon-containing polystyrene resin, carbon-containing acetylcellulose, carbon-containing modified polyphenylene oxide, carbon-containing ethylene-vinyl acetate copolymer, a carbon-containing acetal resin, and a combination thereof. Preferable examples include a carbon-containing fluorine resin, carbon-containing polyester, carbon-containing polyethylene terephthalate, carbon-containing polyvinyl chloride, carbon-containing polypropylene, and a combination thereof. The fluorine resin is preferably a conductive fluorine resin, more preferably conductive polytetrafluoroethylene (PTFE). The conductive resins mentioned above are materials that tend to be negatively charged in the frictional electrification series, and thus may be negatively charged strongly compared to conductive metal such as aluminum and nickel and minerals such as tourmaline that are used in the electrostatic eliminators described in Japanese Patent No. 6168157, Japanese Patent No. 6344292, JP 2019-192568 A, and Japanese Patent No. 6630696. Therefore, in the vehicle according to the present aspect, in which the electrostatic eliminator that is constituted from a conductive resin having a surface resistance value in the above range is disposed at the specific portion, separation of an air flow from the surface of the vehicle body can be particularly suppressed because of the electrostatic elimination effect of the electrostatic eliminator to significantly improve the operational stability of the vehicle compared to vehicles in which the electrostatic eliminators according to the above documents are disposed. In addition, the conductive resins mentioned above have high water repellency, heat resistance, and durability, and thus can substantially suppress adhesion of foreign matter such as muddy water and maintain the electrostatic elimination effect and the effect of improving the operational stability due to the electrostatic elimination effect over a long period.

In the vehicle according to the present aspect, the shape of the electrostatic eliminator can be selected, as appropriate, based on the material and/or the shape of the specific portion at which the electrostatic eliminator is disposed. For example, when the specific portion is shaped to have a smooth surface, the electrostatic eliminator is preferably in the shape of a tape or a coating film, more preferably in the shape of a tape. When the electrostatic eliminator is in the shape of a tape, the electrostatic eliminator preferably has an adhesive on at least a part of a surface that faces the surface of the specific portion. When the electrostatic eliminator is in the shape of a tape, the electrostatic eliminator can be disposed at a desired position of the specific portion. In addition, the dimensions and/or the position of the electrostatic eliminator can be changed easily. When the electrostatic eliminator is in the shape of a coating film, a coating film constituted from the insulating resin mentioned above is preferably provided on at least a part (e.g. at least one coating film layer of a multilayer coating film) of the surface of the specific portion. When the electrostatic eliminator is in the shape of a coating film, the specific portion and the electrostatic eliminator can be integrated with each other.

In the embodiment illustrated in FIG. 1, for example, the electrostatic eliminator 2 is in the shape of a tape. In the present embodiment, the electrostatic eliminator 2 can be applied to a smooth surface of the specific portion 1 via an adhesive 3. The adhesive 3 is preferably conductive. A negative charge of the electrostatic eliminator 2 can move, via the adhesive 3 that is conductive, to the surface and/or the vicinity of the specific portion 1 at which the electrostatic eliminator 2 is disposed.

In the embodiment illustrated in FIG. 2, for example, the electrostatic eliminator 2 is in the shape of a tape. In the present embodiment, the electrostatic eliminator 2 is disposed such that at least one end portion thereof contacts the surface of the specific portion 1. For example, as illustrated in FIG. 2, the electrostatic eliminator 2 is preferably disposed such that at least one end portion thereof is shaped to be bent to contact the surface of the specific portion 1. The electrostatic eliminator 2 can be applied to a smooth surface of the specific portion 1 via the adhesive 3. In the present embodiment, a negative charge of the electrostatic eliminator 2 can move via a contact portion between at least one end portion of the electrostatic eliminator 2 and the surface of the specific portion 1. Therefore, it is not necessary that the adhesive 3 should be conductive. The adhesive 3 may be either conductive or insulating.

In the embodiment illustrated in FIG. 3, for example, the electrostatic eliminator 2 is in the shape of a coating film. In the present embodiment, the electrostatic eliminator 2 is disposed on at least a part of the surface of the specific portion 1. When the electrostatic eliminator 2 is in the shape of a coating film, the specific portion 1 and the electrostatic eliminator 2 can be integrated with each other. A negative charge of the electrostatic eliminator 2 can move, via a contact portion that is the boundary surface between the electrostatic eliminator 2 and the specific portion 1, to the surface and/or the vicinity of the specific portion 1 at which the electrostatic eliminator 2 is disposed.

In the vehicle according to the present aspect, as described above, the electrostatic eliminator may substantially suppress separation of an air flow from the surface of the vehicle body by reducing the repulsive force between the surface of the vehicle body and the air flow and/or generating an electrostatic attraction (Coulomb force) between the front surface of the vehicle body and the air flow via the electrostatic elimination effect due to a negative charge with which the electrostatic eliminator is charged because of external factors. Therefore, the length of the electrostatic eliminator along the flowing direction of the air flow is preferably longer than the length thereof along a direction that is orthogonal to the flowing direction. By disposing the electrostatic eliminator having the above dimensions at the specific portion, separation of an air flow from the surface of the vehicle body can be particularly suppressed via the electrostatic elimination effect of the electrostatic eliminator to significantly improve the operational stability of the vehicle.

Figure 4:
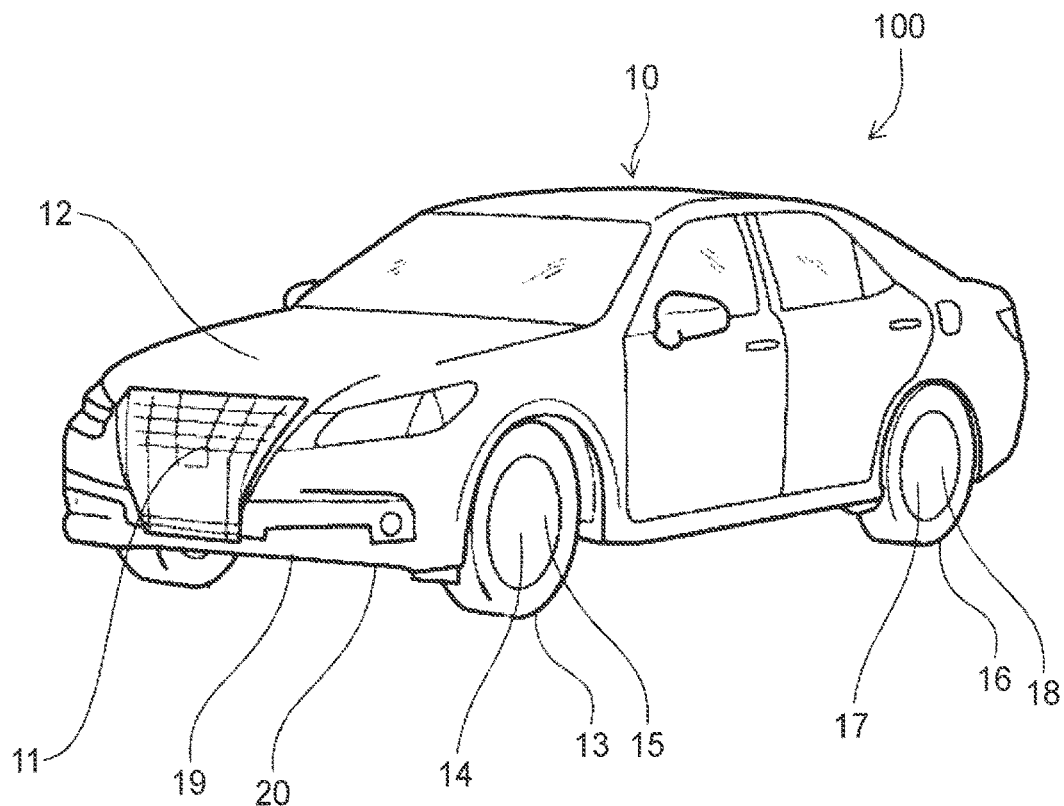
FIG. 4 is a schematic view illustrating an embodiment of a vehicle according to the aspect of the present disclosure.
Figure 5:
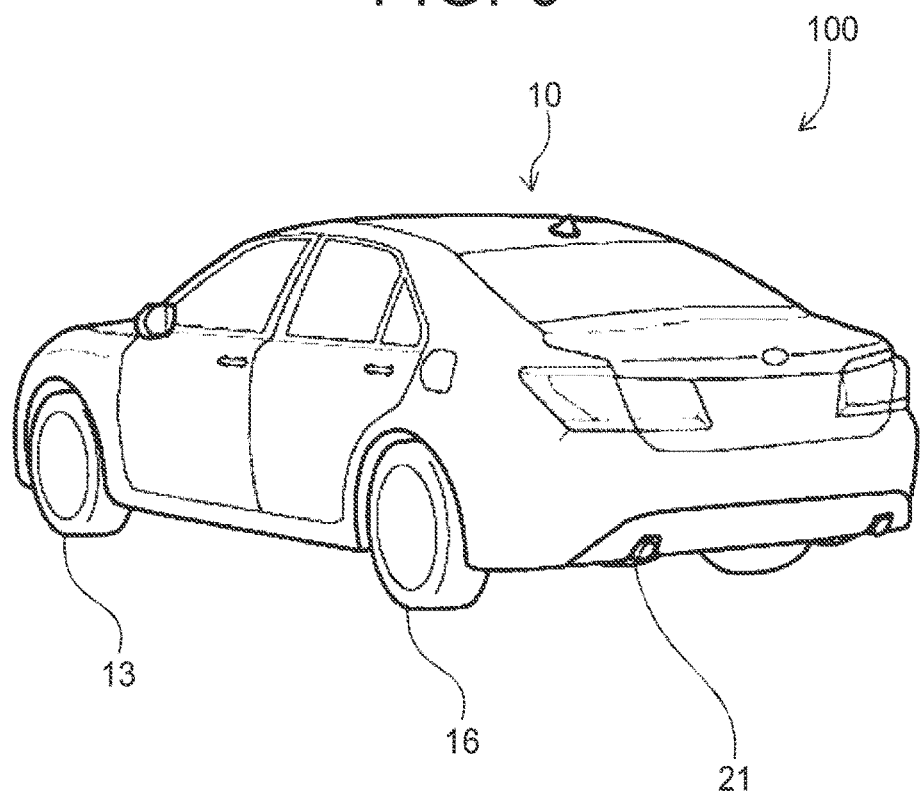
FIG. 5 is a schematic view illustrating another embodiment of a vehicle according to the aspect of the present disclosure.

In the vehicle according to the present aspect, the specific portion and the electrostatic eliminator can be applied to a variety of members. FIGS. 4 and 5 are schematic views illustrating a variety of embodiments of the vehicle according to the present aspect. As illustrated in FIGS. 4 and 5, a vehicle 100 according to the present aspect includes the vehicle body 10. The vehicle body 10 is retained in the state of being insulated from a road surface by tires 13, 16 constituted from an insulator material such as rubber or a material with a low electrical conductivity. In the vehicle 100, the specific portion is preferably wheel nuts 14, 17, wheel nut covers 15, 18, a radiator 11, an engine 12, a transmission 19, a differential 20, or an exhaust pipe 21, more preferably the wheel nuts 14, 17, the wheel nut covers 15, 18, or the exhaust pipe 21. By disposing the electrostatic eliminator at the specific portion mentioned above, separation of an air flow from the surface of the vehicle body can be particularly suppressed via the electrostatic elimination effect of the electrostatic eliminator to significantly improve the operational stability of the vehicle. In addition, by disposing, at the specific portion, the electrostatic eliminator that is constituted from the conductive resin mentioned above, adhesion of foreign matter such as muddy water can be substantially suppressed, and the operational stability can be improved over a long period.

In each aspect of the present disclosure, the electrostatic elimination effect of the vehicle body can be quantitatively measured by preparing a test vehicle for an automobile as the vehicle according to the present aspect, measuring temporal variations in the potential of the surface and/or the tires of the test vehicle during travel using a non-contact surface potential measurement instrument (e.g. capable of measuring the surface potentials of a positive electrode and a negative electrode in the range of 0.1 to 5 kV), for example, although such a measurement method is not limiting.

In each aspect of the present disclosure, the operational stability of the vehicle means the stability of kinetic performance mainly related to steering, among basic kinetic performances of the vehicle such as "run, turn, and stop". The operational stability of the vehicle can be defined based on the followability and the response of the vehicle achieved when the driver of the vehicle actively performs a steering operation, the course keeping performance of the vehicle achieved when the driver of the vehicle does not actively perform a steering operation, the convergence performance against external factors such as the road surface shape and side wind, etc., for example. In each aspect of the present disclosure, the operational stability of the vehicle can be quantitatively measured by preparing a test vehicle for an automobile as the vehicle according to the present aspect and evaluating the response of the test vehicle to maneuvering of the test vehicle, for example, although such a measurement method is not limiting. In the above method, for example, the maneuvering of the test vehicle can be measured in accordance with the steering operation angle, and the response in the behavior of the test vehicle can be measured in accordance with the vehicle yaw angle acceleration, for example. The steering operation angle can be measured using a steered angle sensor mounted on the vehicle, a controller area network (CAN) data logger, etc., for example. Meanwhile, the vehicle yaw angle acceleration can be measured using a gyro sensor etc., for example. Alternatively, the operational stability of the vehicle can be quantitatively measured by preparing a test vehicle for an automobile as the vehicle according to the present aspect and evaluating the fuel efficiency of the test vehicle, for example, although such a measurement method is not limiting.

2. Electrostatic Elimination Component

Another aspect of the present disclosure relates to an electrostatic elimination component.

An electrostatic elimination component according to the present aspect includes an electrostatic eliminator constituted from a conductive resin that may be charged with a negative charge because of external factors (e.g. a conductive resin with a surface resistance value in the range of $10^2 \Omega$ or more and less than $10^{11} \Omega$), and a specific portion constituted from a conductive material (e.g. a conductive material with a surface resistance value that is less than the surface resistance value of the electrostatic eliminator). The electrostatic eliminator and the specific portion are characterized as described above. In the electrostatic elimination component according to the present aspect, the electrostatic eliminator is preferably constituted from a carbon-containing fluorine resin, carbon-containing polyester, carbon-containing polyethylene terephthalate, carbon-containing polyvinyl chloride, carbon-containing polypropylene, and a combination thereof, more preferably constituted from a conductive fluorine resin, still more preferably constituted from conductive PTFE.

In the electrostatic elimination component according to the present aspect, the electrostatic eliminator may be in the shape of a tape and with an adhesive on at least a part of a surface that faces the surface of the specific portion, or may be in the shape of a coating film integrated with the specific portion.

In the electrostatic elimination component according to the present aspect, when the electrostatic eliminator is in the shape of a tape, the electrostatic eliminator is applied to a smooth surface of the specific portion via an adhesive. In the present embodiment, the adhesive may be either conductive or insulating. When the adhesive is conductive, the negative charge of the electrostatic eliminator can reduce a positive charge on the surface and/or in the vicinity of the specific portion at which the electrostatic eliminator is disposed, and/or charge, with a negative charge, the surface and/or the vicinity of the specific portion at which the electrostatic eliminator is disposed. In the present embodiment, the electrostatic eliminator can be disposed such that at least one end portion thereof contacts the surface of the specific portion. For example, the electrostatic eliminator is preferably disposed such that at least one end portion thereof is shaped to be bent to contact the surface of the specific portion. In the present embodiment, a charge can move via a contact portion between at least one end portion of the electrostatic eliminator and the surface of the specific portion. Therefore, it is not necessary that the adhesive should be conductive. The adhesive may be either conductive or insulating.

In the electrostatic elimination component according to the present aspect, when the electrostatic eliminator is in the shape of a coating film, the electrostatic eliminator is disposed on at least a part of the surface of the specific portion. When the electrostatic eliminator is in the shape of a coating film, the specific portion and the electrostatic eliminator can be integrated with each other. A negative charge of the electrostatic eliminator can move, via a contact portion that is the boundary surface between the electrostatic eliminator and the specific portion, to the surface and/or the vicinity of the specific portion at which the electrostatic eliminator is disposed.

Figure 6:
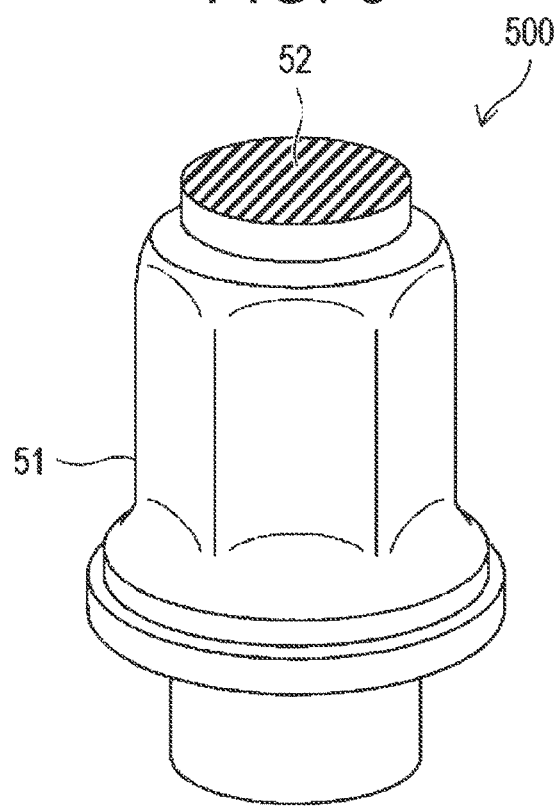
FIG. 6 is a schematic view illustrating an embodiment of an electrostatic elimination component according to the aspect of the present disclosure.
Figure 7:
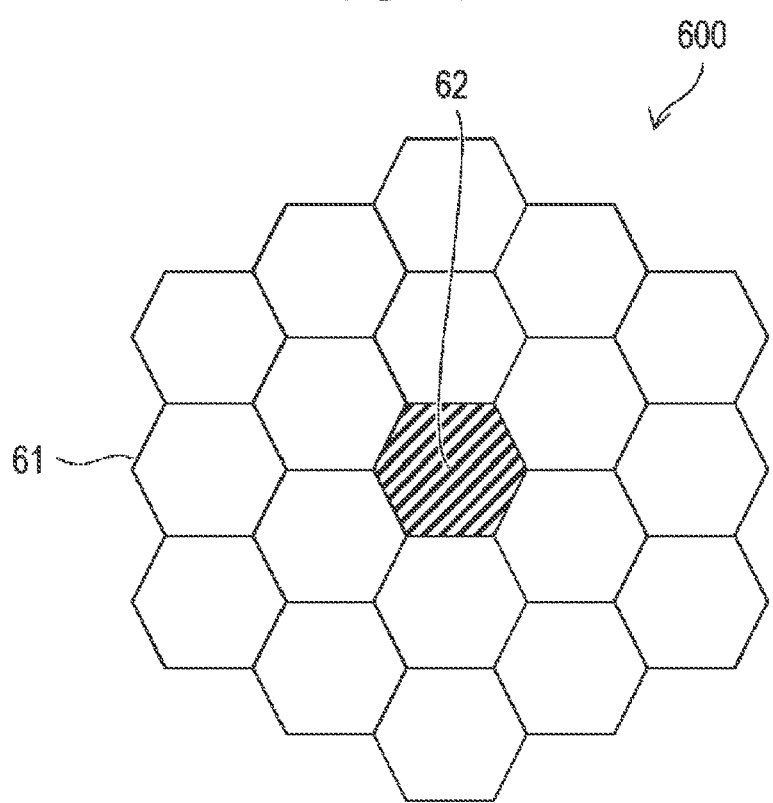
FIG. 7 is a schematic view illustrating another embodiment of an electrostatic elimination component according to the aspect of the present disclosure.

FIGS. 6 and 7 illustrate a variety of embodiments of the electrostatic elimination component according to the present aspect. In the embodiment illustrated in FIG. 6, for example, an electrostatic elimination component 500 has a specific portion 51 that is a wheel nut and an electrostatic eliminator 52 disposed on at least a part of the surface of the specific portion 51. In the present embodiment, the electrostatic eliminator 52 may be in the shape of a tape and with an adhesive on at least a part of a surface that faces the surface of the specific portion 51, or may be in the shape of a coating film integrated with the specific portion 51.

In the embodiment illustrated in FIG. 7, for example, an electrostatic elimination component 600 has a specific portion 61 that is a wheel nut cover and an electrostatic eliminator 62 disposed on at least a part of the surface of the specific portion 61. In the present embodiment, the electrostatic eliminator 62 may be in the shape of a tape and with an adhesive on at least a part of a surface that faces the surface of the specific portion 61, or may be in the shape of a coating film integrated with the specific portion 61.

The electrostatic elimination component according to the present aspect can be applied to a vehicle having a vehicle body that is retained in the state of being insulated from a road surface and that is positively charged by static electricity due to external factors including traveling. In the vehicle to which the electrostatic elimination component according to the present aspect is applied, the specific portion is used as a portion to be positively charged at which a positively charged air flow that flows around the vehicle body during travel starts to vary from a flow along the surface of the charged vehicle body to a flow separated from the surface. By applying the electrostatic elimination component according to the present aspect to the vehicle, separation of an air flow from the surface of the vehicle body can be substantially suppressed via the electrostatic elimination effect of the electrostatic eliminator to significantly improve the operational stability of the vehicle. In addition, by applying the electrostatic elimination component according to the present aspect, which is constituted from the conductive resin mentioned above, to the vehicle, adhesion of foreign matter such as muddy water can be substantially suppressed, and the operational stability of the vehicle can be improved over a long period.

3. Electrostatic Eliminator

Another aspect of the present disclosure relates to an electrostatic eliminator.

The electrostatic eliminator according to the present aspect is characterized as described above. The electrostatic eliminator according to the present aspect is constituted from a conductive resin, and preferably constituted from a carbon-containing fluorine resin, carbon-containing polyester, carbon-containing polyethylene terephthalate, carbon-containing polyvinyl chloride, carbon-containing polypropylene, and a combination thereof, more preferably constituted from a conductive fluorine resin, still more preferably constituted from conductive PTFE. The electrostatic eliminator according to the present aspect is preferably in the shape of a tape or a coating film, more preferably in the shape of a tape.

In a vehicle having a vehicle body that is retained in the state of being insulated from a road surface and that is positively charged by static electricity due to external factors including traveling, the electrostatic eliminator according to the present aspect is applied to a specific portion to be positively charged at which a positively charged air flow that flows around the vehicle body during travel starts to vary from a flow along the surface of the charged vehicle body to a flow separated from the surface. By applying the electrostatic eliminator according to the present aspect to the specific portion of the vehicle, separation of an air flow from the surface of the vehicle body can be substantially suppressed via the electrostatic elimination effect of the electrostatic eliminator to significantly improve the operational stability of the vehicle. In addition, by disposing, at the specific portion of the vehicle, the electrostatic eliminator according to the present aspect, which is constituted from the insulating fluorine resin mentioned above, adhesion of foreign matter such as muddy water can be substantially suppressed, and the operational stability of the vehicle can be improved over a long period.

4. Method of Manufacturing Vehicle

Another aspect of the present disclosure relates to a manufacturing method for the vehicle according to the aspect of the present disclosure. The method according to the present aspect includes an electrostatic eliminator preparation step and an electrostatic eliminator arrangement step.

In the method according to the present aspect, the electrostatic eliminator preparation step includes preparing the electrostatic eliminator characterized as described above. This step may be performed by fabricating the electrostatic eliminator characterized as described above, or may be performed by purchasing etc. the electrostatic eliminator. Either case is included in the embodiment of this step.

In the method according to the present aspect, the electrostatic eliminator arrangement step includes disposing the electrostatic eliminator prepared in the above step at the specific portion of the vehicle characterized as described above. This step can be performed, as appropriate, based on the shape of the electrostatic eliminator. For example, when the electrostatic eliminator is in the shape of a tape, this step can be performed by applying the electrostatic eliminator to the surface of the specific portion via an adhesive. When the electrostatic eliminator is in the shape of a coating film, meanwhile, this step can be performed by applying or baking a paint containing the conductive resin mentioned above to the surface of the specific portion to form a coating film constituted from the conductive resin on the surface of the specific portion. Either case is included in the embodiment of this step.

5. Method of Manufacturing Electrostatic Elimination Component

Another aspect of the present disclosure relates to a manufacturing method for the electrostatic elimination component according to the aspect of the present disclosure. The method according to the present aspect includes an electrostatic eliminator preparation step, a specific portion preparation step, and an electrostatic eliminator arrangement step.

In the method according to the present aspect, the electrostatic eliminator preparation step includes preparing the electrostatic eliminator characterized as described above. This step may be performed by fabricating the electrostatic eliminator characterized as described above, or may be performed by purchasing etc. the electrostatic eliminator. Either case is included in the embodiment of this step.

In the method according to the present aspect, the specific portion preparation step includes preparing the specific portion characterized as described above. This step may be performed by fabricating the specific portion characterized as described above, or may be performed by purchasing etc. the specific portion. Either case is included in the embodiment of this step.

In the method according to the present aspect, the electrostatic eliminator arrangement step includes disposing the electrostatic eliminator prepared in the above step at the specific portion prepared in the above step. This step can be performed, as appropriate, based on the shapes of the electrostatic eliminator and the specific portion. For example, when the electrostatic eliminator is in the shape of a tape, this step can be performed by applying the electrostatic eliminator to the surface of the specific portion via an adhesive. When the electrostatic eliminator is in the shape of a coating film, meanwhile, this step can be performed by applying or baking a paint containing the conductive resin mentioned above to the surface of the specific portion to form a coating film constituted from the conductive resin on the surface of the specific portion. Either case is included in the embodiment of this step.

6. Method of Improving Operational Stability of Vehicle

Another aspect of the present disclosure relates to a method of improving the operational stability of a vehicle. The method according to the present aspect includes a step of disposing an electrostatic eliminator at a specific portion of a vehicle. The specific portion of the vehicle and the electrostatic eliminator applied in the method according to the present aspect are the specific portion of the vehicle and the electrostatic eliminator characterized as described above.

By implementing the method according to the present aspect, separation of an air flow from the surface of the vehicle body can be particularly suppressed via the electrostatic elimination effect of the electrostatic eliminator to significantly improve the operational stability of the vehicle. In addition, by disposing, at the specific portion, the electrostatic eliminator that is constituted from the insulating fluorine resin mentioned above, adhesion of foreign matter such as muddy water can be substantially suppressed, and the operational stability can be improved over a long period.

The present disclosure will be further specifically described below using examples. However, the technical scope of the present disclosure is not limited to such examples.

A: Test for Measuring Operational Stability

In Example A-1, a test vehicle in which an antistatic conductive PTFE tape (surface resistance value: 2.6×10$^5$ Ω, 13 mm×50 mm) having an insulating silicone adhesive was applied to a wheel nut was prepared. The tape was partially folded so that the surface of the tape contacted the surface of the wheel nut. In Comparative Example A-1, a test vehicle of the same model in which no tape was applied was prepared. In Comparative Example A-2, a test vehicle of the same model in which an aluminum tape (13 mm×50 mm) having a common adhesive was applied at the same position of a wheel nut was prepared.

The test vehicles according to Example A-1 and Comparative Example A-2 were subjected to a travel test conducted based on the test conditions indicated in Table 1. The sensory evaluation value of the test vehicle according to Comparative Example A-2 was improved by 0.125, while the sensory evaluation value of the test vehicle according to Example A-1 was improved by 0.25. From the above test results, it turned out that the operational stability of the test vehicle according to Example A-1 was improved about twice over that of the test vehicle according to Comparative Example A-2 in which the aluminum tape was applied.

TABLE 1

| Evaluation method | Sensory evaluation for a pair (default vehicle vs evaluation vehicle) |
|---|---|
| Grading method | Seven grades of −3, −2, −1, 0, +1, +2, and +3 (3: high, 2: medium, 1: low) |
| Evaluation panel | Four persons |
| Location of evaluation | Test course (Higashi-Fuji/Head Office) |
| Evaluation item | Operational stability |
| | Straight travel stability |
| | Steering response |
| Test vehicle | RX450h  GYL25W-AWXGB(L) |

B: Test for Measuring Electrostatic Elimination Effect of Vehicle Body

In Example B-1, a test vehicle in which an antistatic conductive PTFE tape (surface resistance value: 2.6×10$^5$ Ω, 13 mm×50 mm) having an insulating silicone adhesive was applied to a wheel nut was prepared. The tape was partially folded so that the surface of the tape contacted the surface of the wheel nut. In Comparative Example B-1, a test vehicle of the same model in which no tape was applied was prepared.

Figure 8:
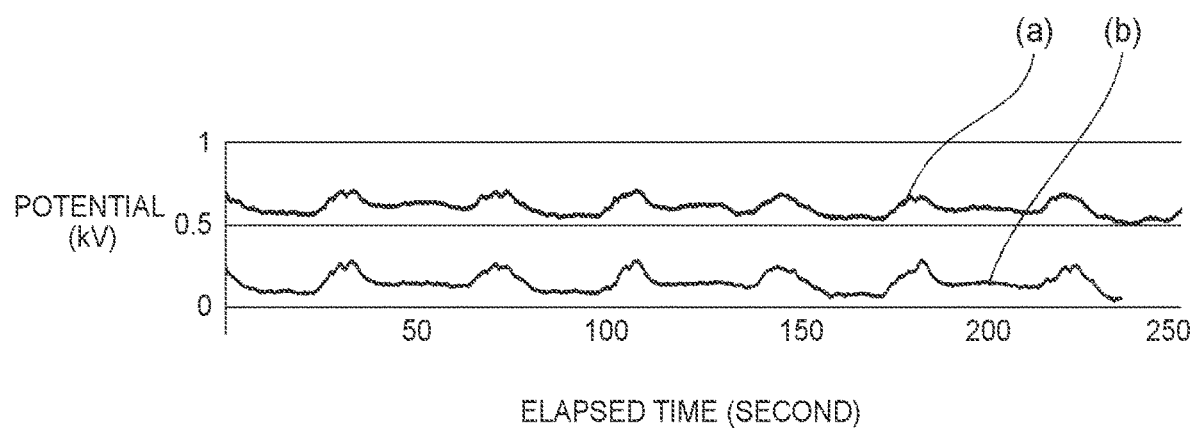
FIG. 8 is a graph indicating temporal variations in a potential of a fender liner in a test for measuring an electrostatic elimination effect of a vehicle body, in which (a) indicates a measurement result for a test vehicle according to Comparative Example B-1 and (b) indicates a measurement result for a test vehicle according to Example B-1, and a horizontal axis represents elapsed time (seconds) and a vertical axis represents a potential (kV).

The test vehicles according to Example B-1 and Comparative Example B-1 were caused to travel at a speed of about 45, 70, and 100 km/h after being started and subjected to warm-up operation at a speed of about 100 km/h. During travel, the potential of a front fender liner was measured using a non-contact surface potential measurement instrument (capable of measuring the surface potentials of a positive electrode and a negative electrode in the range of 0.1 to 5 kV). FIG. 8 indicates temporal variations in the fender liner potential. In FIG. 8, (a) indicates the measurement result for the test vehicle according to Comparative Example B-1, and (b) indicates the measurement result for the test vehicle according to Example B-1. The horizontal axis represents the elapsed time (seconds), and the vertical axis represents the potential (kV).

As indicated in FIG. 8, in the test vehicle according to Comparative Example B-1, the potential was fluctuated in the range of +0.50 to +1 kV. In the test vehicle according to Example B-1, meanwhile, the potential was fluctuated in the range of 0 to +0.5 kV. It turned out, from the above results, that the positive charge of the vehicle body was reduced in the test vehicle according to Example B-1.

What is claimed is:

1. A vehicle comprising:
a vehicle body configured to be retained in a state of being insulated from a road surface and to be positively charged by static electricity due to external factors including traveling; and
an electrostatic eliminator that reduces a positive charge of a specific portion or that charges the specific portion with a negative charge, the specific portion being defined as a portion to be positively charged at which a positively charged air flow that flows around the vehicle body during travel starts to vary from a flow along a surface of the positively charged vehicle body to a flow separated from the surface,
wherein the specific portion is constituted from a conductive material with a surface resistance value that is less than a surface resistance value of the electrostatic eliminator, the electrostatic eliminator is constituted from a conductive resin with a surface resistance value in a range of $10^2\Omega$ or more and less than $10^{11}\Omega$, the electrostatic eliminator is in a shape of a tape and with an adhesive provided on at least a part of a surface of the electrostatic eliminator, the surface facing a surface of the specific portion, and at least one end portion of the electrostatic eliminator is shaped to be bent to contact the specific portion.

2. The vehicle according to claim 1, wherein the conductive resin is at least one resin selected from the group consisting of fluorine resin, polyester, polyethylene terephthalate, polyvinyl chloride, polypropylene, and a combination of the fluorine resin, the polyester, the polyethylene terephthalate, the polyvinyl chloride, and the polypropylene.

3. The vehicle according to claim 2, wherein the conductive resin is a conductive fluorine resin.

4. The vehicle according to claim 1, wherein the specific portion is a wheel nut, a wheel nut cover, a radiator, an engine, a transmission, a differential, or an exhaust pipe.

5. An electrostatic elimination component comprising:

an electrostatic eliminator constituted from a conductive resin with a surface resistance value in a range of $10^2\Omega$ or more and less than $10^{11}\Omega$; and a specific portion constituted from a conductive material with a surface resistance value that is less than the surface resistance value of the electrostatic eliminator, wherein the electrostatic eliminator is in a shape of a tape and with an adhesive provided on at least a part of a surface of the electrostatic eliminator, the surface facing a surface of the specific portion, and at least one end portion of the electrostatic eliminator is shaped to be bent to contact the specific portion.

6. The electrostatic elimination component according to claim 5, wherein the specific portion is a wheel nut, a wheel nut cover, a radiator, an engine, a transmission, a differential, or an exhaust pipe.

* * * * *